(12) United States Patent
Choi (10) Patent No.: US 7,454,474 B2
(45) Date of Patent: Nov. 18, 2008

(54) METHOD FOR TRANSMITTING AND RECEIVING DATA BETWEEN ENTITIES IN HOME NETWORK REMOTE MANAGEMENT SYSTEM

(75) Inventor: Ji-Won Choi, Anyang (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1076 days.

(21) Appl. No.: 10/639,496

(22) Filed: Aug. 13, 2003

(65) Prior Publication Data

US 2004/0039744 A1 Feb. 26, 2004

(30) Foreign Application Priority Data

Aug. 21, 2002 (KR) ...................... 10-2002-0049545

(51) Int. Cl.
*G06F 15/16* (2006.01)
*G06F 15/173* (2006.01)
(52) U.S. Cl. ........................ 709/207; 709/217; 709/223
(58) Field of Classification Search ........................ None
See application file for complete search history.

(56) References Cited

U.S. PATENT DOCUMENTS

| | | | |
|---|---|---|---|
| 6,272,150 B1 * | 8/2001 | Hrastar et al. ................ | 370/486 |
| 6,442,158 B1 | 8/2002 | Beser | |
| 6,553,568 B1 | 4/2003 | Fijolek et al. | |
| 7,161,619 B1 * | 1/2007 | Niida et al. ............. | 348/207.11 |
| 2002/0071440 A1 | 6/2002 | Cerami et al. | |
| 2002/0078017 A1 | 6/2002 | Cerami et al. | |
| 2002/0157018 A1 * | 10/2002 | Syvanne ...................... | 713/200 |
| 2003/0233434 A1 * | 12/2003 | Knight ....................... | 709/223 |
| 2004/0006611 A1 * | 1/2004 | Yi ............................... | 709/222 |
| 2004/0039744 A1 * | 2/2004 | Choi ........................... | 707/10 |
| 2004/0186837 A1 * | 9/2004 | Lambert et al. ............... | 707/10 |
| 2005/0198278 A1 * | 9/2005 | Setogawa et al. ........... | 709/224 |
| 2005/0246343 A1 * | 11/2005 | Burns et al. .................. | 707/10 |

* cited by examiner

*Primary Examiner*—John B. Walsh
(74) *Attorney, Agent, or Firm*—Robert E. Bushnell, Esq.

(57) ABSTRACT

The present invention discloses a method for transmitting and receiving data between entities in a home network remote management system for remotely managing a home network composed of at least one entity which creates the message for transport of data with TCP (Transmission Control Protocol) packet, and transmits and receives the message between the entities, in which the message includes a message type field indicating a type of the message, a frame number field distinguishing multiple packets by allocating unique numbers, a message body length field indicating a length of a message body, an operation type field indicating a type of an operation which will be performed between the entities, a frame header extension field indicating existence of a succeeding packet, an information element field indicating an information element which will be processed, and a message body extension field indicating the end of the information element.

25 Claims, 9 Drawing Sheets

| Field | Length (Byte(s)) | Description & Index |
|---|---|---|
| MT | 1 | Message type<br>1. inquiry request, 2 : inquiry response<br>3 : setup request , 4 : setup response<br>5 : notification request, 6 : notification response |
| FN | 2 | frame number, distinguish multiple packets by allocating unique packet numbers |
| MBL | 2 | Message Body Length |
| OT | 1 | type of operation |
| Frame Header Extension | 2 | existence of succeeding packet<br>1 : absence of succeeding message packet<br>2 : existence of succeeding message packet |
| information element | – | |
| Message Body Extension | 2 | end of information element<br>1 : absence of succeeding message packet |

FIG. 3

| Item | Size (byte(s)) | Description |
|---|---|---|
| Information element identifier | 2 | information element identifier |
| Information element length size(Bytes) | 2 | information element identifier size(2) +<br>information element length size(2) +<br>information element value size(2 or N) |
| Information element value | 2 or N | corresponding information element value<br>2 : 2bytes Integer<br>N : Nbytes String |

FIG. 4

| Field | Length (Byte(s)) | Description & Index |
|---|---|---|
| MT | 1 | 5 : Notification request |
| FN | 2 | frame number |
| MBL | 2 | display total length of header and information element region in octets |
| OT | 1 | type of fault |
| Time stamp | 4 | notification generation time |
| Frame Header Extension | 2 | existence of succeeding packet |
| information 1 | 6 or N | |
| ... | 6 or N | |
| information N | 6 or N | |
| Message Body Extension | 2 | end of information element |

FIG. 5

| Field | Length (Byte(s)) | Description & Index |
|---|---|---|
| MT | 1 | 6 : Notification response |
| FN | 2 | frame number |
| MBL | 2 | display total length of header and information element region in octets |
| OT | 1 | type of fault |
| Time stamp | 4 | notification generation time |
| Frame Header Extension | 2 | existence of succeeding packet |
| information 1 | 6 or N | |
| ... | 6 or N | |
| information N | 6 or N | |
| Message Body Extension | 2 | end of information element |

FIG. 6

| Field | Length (Byte(s)) | Description & Index |
|---|---|---|
| MT | 1 | 1 : inquiry request |
| FN | 2 | frame number |
| MBL | 2 | display total length of header and information element region in octets |
| OT | 1 | type of inquiry message |
| Frame Header Extension | 2 | existence of succeeding packet |
| error index | 2 | error index during process, 0 in request |
| information 1 | 6 or N | |
| ... | 6 or N | |
| information N | 6 or N | |
| Message Body Extension | 2 | end of information element |

<information element stream>

| Type | Length | Value | ... | Type | Length | Value |
|---|---|---|---|---|---|---|
| X | Y | – | ... | X' | Y' | – |

FIG. 7

| Field | Length (Byte(s)) | Description & Index |
|---|---|---|
| MT | 1 | 2 : inquiry response |
| FN | 2 | frame number |
| MBL | 2 | display total length of header and information element region in octets |
| OT | 1 | type of inquiry message |
| Frame Header Extension | 2 | existence of succeeding packet |
| error index | 2 | error index during process |
| information 1 | 6 or N | |
| ... | 6 or N | |
| information N | 6 or N | |
| Message Body Extension | 2 | end of information element |

<information element stream>

| Type | Length | Value | ... | Type | Length | Value |
|---|---|---|---|---|---|---|
| X | Y | Z | ... | X' | Y' | Z' |

FIG. 8

| Field | Length (Byte(s)) | Description & Index |
|---|---|---|
| MT | 1 | 3 : setup request |
| FN | 2 | frame number |
| MBL | 2 | display total length of header and information element region in octets |
| OT | 1 | type of setup message |
| Frame Header Extension | 2 | existence of succeeding packet |
| error index | 2 | error index during process, 0 in request |
| information 1 | 6 or N | |
| ... | 6 or N | |
| information N | 6 or N | |
| Message Body Extension | 2 | end of information element |

<information element stream>

| Type | Length | Value | ... | Type | Length | Value |
|---|---|---|---|---|---|---|
| X | Y | Z | ... | X' | Y' | Z' |

FIG. 9

| Field | Length (Byte(s)) | Description & Index |
|---|---|---|
| MT | 1 | 4 : setup response |
| FN | 2 | frame number |
| MBL | 2 | display total length of header and information element region in octets |
| OT | 1 | type of setup message |
| Frame Header Extension | 2 | existence of succeeding packet |
| error index | 2 | error index during process |
| information 1 | 6 or N | |
| ... | 6 or N | |
| information N | 6 or N | |
| Message Body Extension | 2 | end of information element |

<information element stream>

| Type | Length | Value | ... | Type | Length | Value |
|---|---|---|---|---|---|---|
| X | Y | Z | ... | X' | Y' | Z' |

FIG. 10

METHOD FOR TRANSMITTING AND RECEIVING DATA BETWEEN ENTITIES IN HOME NETWORK REMOTE MANAGEMENT SYSTEM

CLAIM OF PRIORITY

This application makes reference to, incorporates the same herein, and claims all benefits accruing under 35 U.S.C. §119 from an application for METHOD FOR TRANSMITTING AND RECEIVING DATA ENTITY IN HOME NETWORK REMOTE MANAGEMENT SYSTEM earlier filed in the Korean Intellectual Property Office on 21 Aug. 2002 and there duly assigned Serial No. 2002-49545.

BACKGROUND OF THE INVENTION

1. Field of the Invention

The present invention relates to a method for transmitting and receiving data between entities in a home network remote management system, and more particularly to a method for transmitting and receiving data between entities in a home network remote management system which uses an Internet TCP (Transmission Control Protocol) socket for efficient communication between a CPE (Customer Premises Equipment) and a local equipment which is an equipment on the home network in the remote management system for managing the CPE, PC (Personal Computer) connected to the CPE and local equipment.

2. Description of the Related Art

A home network includes at least one entity. Here, the entity implies various premises equipments connected to each other through the home network. For example, the entity includes a PC or CPE.

The CPE is a termination apparatus provided by a communication service provider and connected to a network of the provider, such as a terminal, settop box, cable modem and ADSL (asymmetric digital subscriber line) modem.

On the other hand, a general management system for broadband clients uses very few functions, and thus merely displays notices on a bulletin board or downloads a driver file.

A variety of network elements are remotely managed on an EMS (Equipment Management System) through remote communication control. Accordingly, a home network management system for managing the CPE also needs to perform fault localization or other constitution and setup operations by using a scheme for managing a communication equipment system in the EMS.

SUMMARY OF THE INVENTION

It is, therefore, an object of the present invention to provide a method for transmitting and receiving data between entities in a home network remote management system which embodies simple communication between the entities such as a terminal apparatus, a personal computer and a customer premises equipment by using a protocol for efficiently processing the communication between the entities by using an existing source.

It is another object to provide a technique and an apparatus for transmitting and receiving data between entities in a network remote management system by having information for operation of the remote management system being assigned to the header and body of the message to perform reliable communication between entities of the network remote management system.

It is yet another object to provide a remote management system that can remotely monitor and control customer equipments by efficiently managing the respective information elements.

It is still another object to provide a technique for transmitting and receiving data between entities in a network remote management system that is efficient and cost effective.

To achieve the above and other objects, there is provided a method for transmitting and receiving data between entities in a home network remote management system for remotely managing a home network composed of at least one entity which adds data to a TCP packet message and transmits and receives the TCP message between the entities, wherein the message includes a message type field indicating a type of the message, a frame number field distinguishing multiple packets by allocating unique numbers, a message body length field indicating a length of a message body, an operation type field indicating a type of an operation which will be performed between the entities, a frame header extension field indicating existence of a succeeding packet, an information element field indicating an information element which will be processed, and a message body extension field indicating the end of the information element.

The type of message includes at least one of a notification message notifying a message from one entity to the other, an inquiry message allowing one entity to take a specific information value from the other entity, and a setup message allowing one entity to set up a specific information value in the other entity.

Here, each message is a request message or response message.

In addition, the information element field includes an information element identifier field, an information element length field and an information element value field. Here, the information element identifier field includes information element item, the information element length field includes size of the information element identifier field and the information element length field and the information element value field, and the information element value field includes value information of the corresponding information element.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
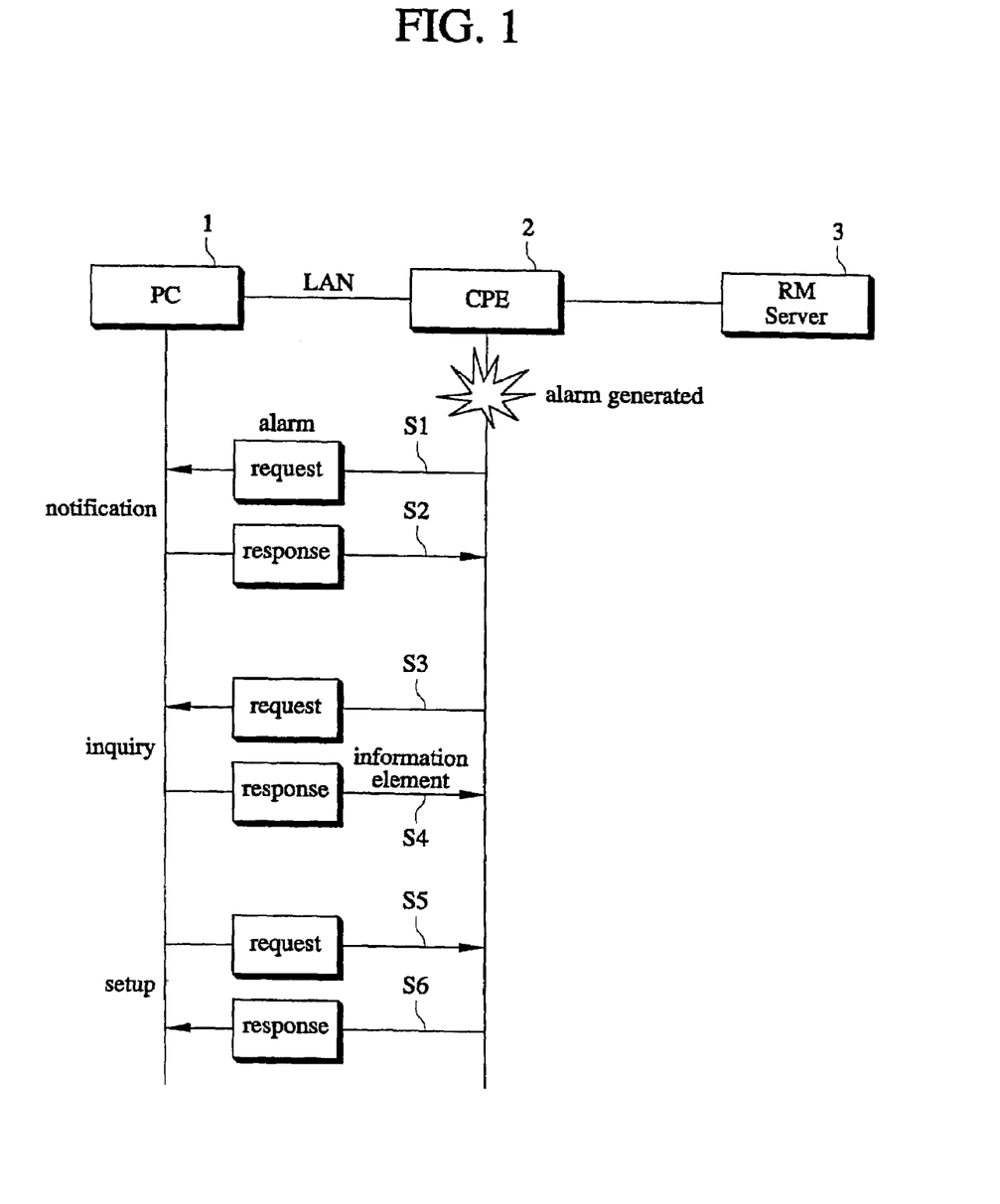
FIG. 1 is a flowchart showing sequential steps of a method for transmitting and receiving data between entities in a home network remote management system in accordance with a preferred embodiment of the present invention.

FIG. 1 is a flowchart showing sequential steps of a method for transmitting and receiving data between entities in a home network remote management system in accordance with the preferred embodiment of the present invention. Referring to FIG. 1, the home network remote management system includes a PC 1, a CPE 2, and a home network RM (Remote Management) server 3 for remotely managing the PC 1 and the CPE 2 through a network. The method for transmitting and receiving data between the PC 1 and the CPE 2 in the home network remote management system will now be explained.

In this embodiment, the PC 1 manages the CPE 2. That is, when an alarm which needs to be notified is generated in the CPE 2, the CPE 2 notifies the alarm to the PC 1, and the PC 1 inquires about various status information of the CPE 2 and sets up a predetermined setup value in the CPE 2.

Therefore, a message format can be formed in three types, namely notification, inquiry and setup formats. Each message can be divided into a request message or a response message. The notification message allows one entity to notify the message to the other entity, the inquiry message allows one entity to take a specific information value from the other entity, and the setup message allows one entity to set up a specific information value in the other entity. The three messages are formed on the basis of the TCP/IP (Transmission Control Protocol/Internet Protocol) protocol, and composed of a header and a body.

One entity can communicate with the other entity by using the three formats. The operation of the three messages will now be explained.

The notification message corresponds to a trap of an SNMP (Simple Network Management Protocol). According to a property of TCP, Ack (Acknowledgment) must be transmitted, and thus the response message is transmitted, which improves reliability of the notification message.

The inquiry message corresponds to GetRequest PDU (Protocol Data Unit) of the SNMP, and allows one entity to inquire about a management information value of the other entity.

The setup message corresponds to SetRequest PDU of the SNMP, and allows one entity to set up a management information value of the other entity.

Figure 2:
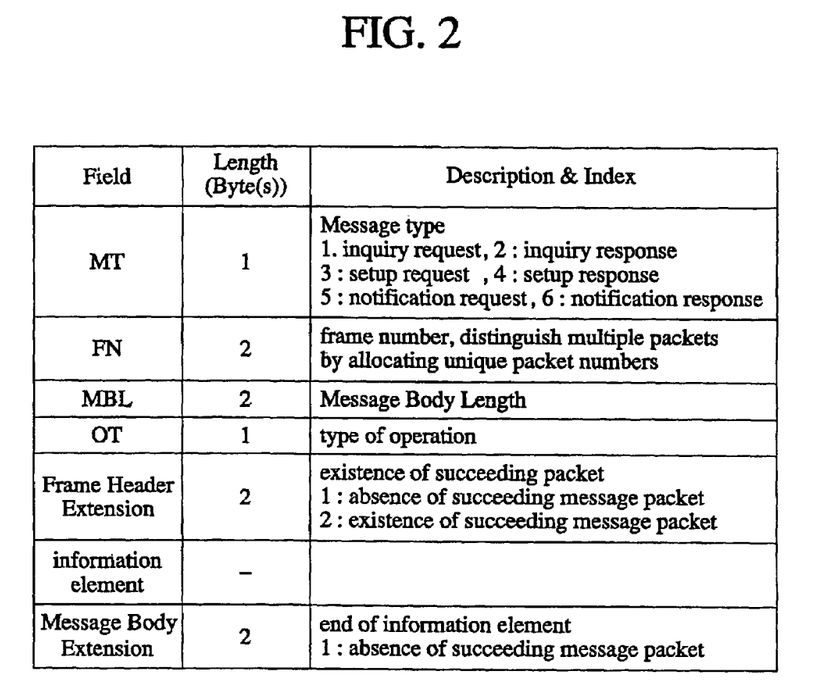
FIG. 2 is a table showing a general TCP packet message format having data which will be transmitted and received between the entities in accordance with the preferred embodiment of the present invention.

FIG. 2 is a table showing a general TCP packet message format having data which will be transmitted and received between the entities in accordance with the preferred embodiment of the present invention. The TCP packet message format having the data which will be transmitted and received between the entities will now be explained with reference to FIG. 2.

As illustrated in FIG. 2, the TCP packet message includes a message type field MT indicting a type of the message, a frame number field FN distinguishing multiple packets by allocating unique numbers, a message body length field MBL indicating a length of the message body, an operation type field OT indicating a type of an operation which will be performed between the entities, a frame header extension field indicating existence of a succeeding packet, an information element field indicating an information element which will be processed, and a message body extension field indicating the end of the information element.

The message type field indicates the type of the message, and for example, 1 byte is allocated. Here, according to the setup values, '1' implies inquiry request, '2' implies inquiry response, '3' implies setup request, '4' implies setup response, '5' implies notification request, and '6' implies notification response.

The frame number field has information on frame numbers for distinguishing the multiple packets by allocating unique numbers, and for example, 2 bytes are allocated.

The message body length field allocated with 2 bytes includes information on the length of the message body.

The operation type field which stores information on the type of the operation is allocated with 1 byte.

The frame header extension field indicates existence of the succeeding packet. Here, '1' implies absence of the succeeding message packet, and '2' implies existence of the succeeding message packet.

The message body extension field indicates the end of the information element. When it is set up as '1', the succeeding message packet does not exist.

Here, the frame header extension field or the message body extension field is used to decide generation of an error and to correct the error during the transmission of the packet data.

Figure 3:
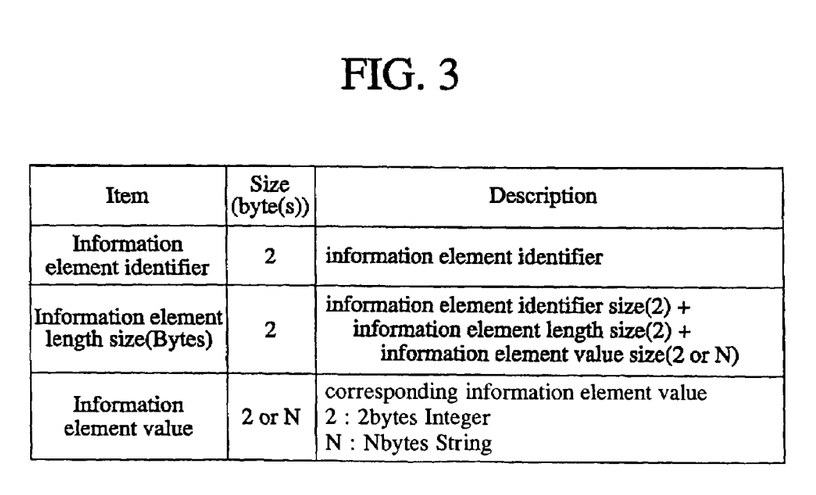
FIG. 3 is a table showing a structure of an information element of the message format of FIG. 2.

FIG. 3 is a table showing a structure of the information element of the message format of FIG. 2.

As shown in FIG. 3, the information element field includes an information element identifier field, an information element length field and an information element value field.

The information element identifier field includes information element item information, and for example, 2 bytes are allocated. The information element length field includes size of the information element identifier field, the information element length field and the information element value field, and for example, 2 bytes are allocated. That is, the information element length field has information that a size of the information element identifier field is 2 bytes, a size of the information element length field is 2 bytes, and a size of the information element value field is 2 bytes or N bytes. The information element value field includes value information of the corresponding information element. For example, when a value of the information element is 2 bytes, the information element value field has 2 byte integer information, and when the value of the information element is N, it has N byte string information.

Figure 4:
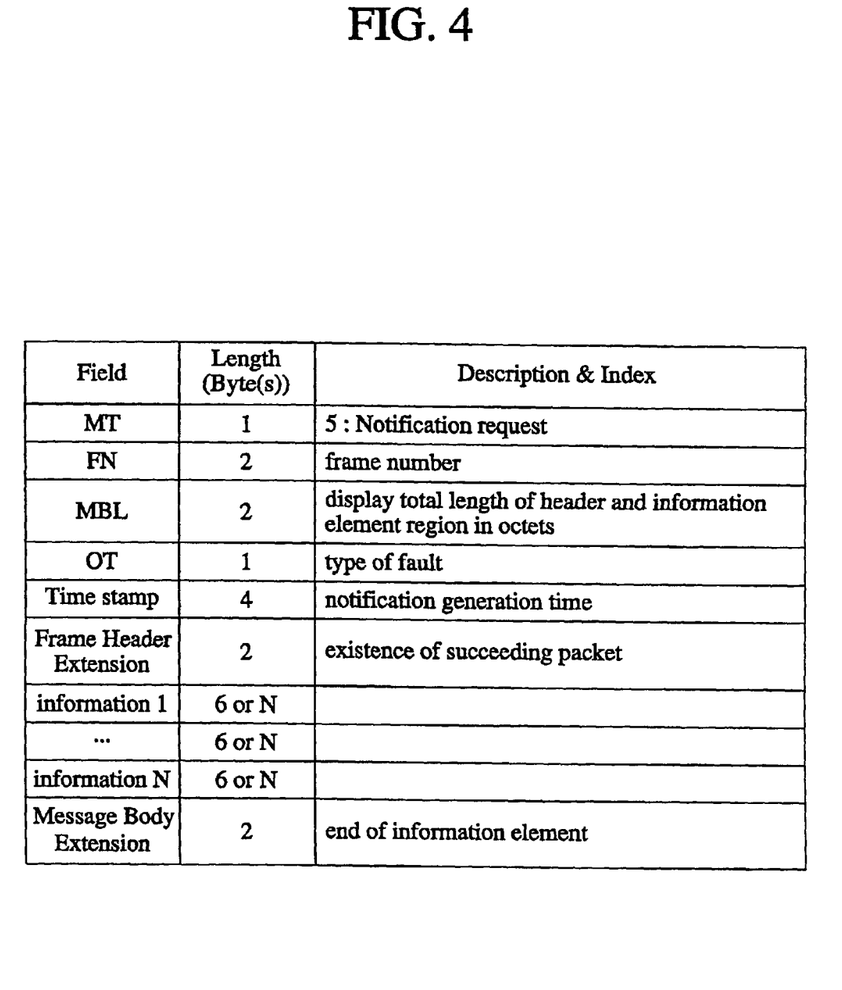
FIG. 4 is a table showing a request message format of a notification message of FIG. 1.

FIG. 4 is a table showing a request message format of the notification message of FIG. 1.

The notification request message can be distinguished by '5' set up in the message type field. The corresponding frame number is allocated to the frame number field, and the total length of the header and information element region is displayed in octets in the message body length field.

The operation type field has fault information. Here, a notification generation time can be displayed by using a time stamp field.

The frame header extension field indicates existence of the succeeding packet. In the information element, a plurality of fields can be consecutively aligned. The message body extension field is located in the end point of the information field to notify the end of the information element.

Figure 5:
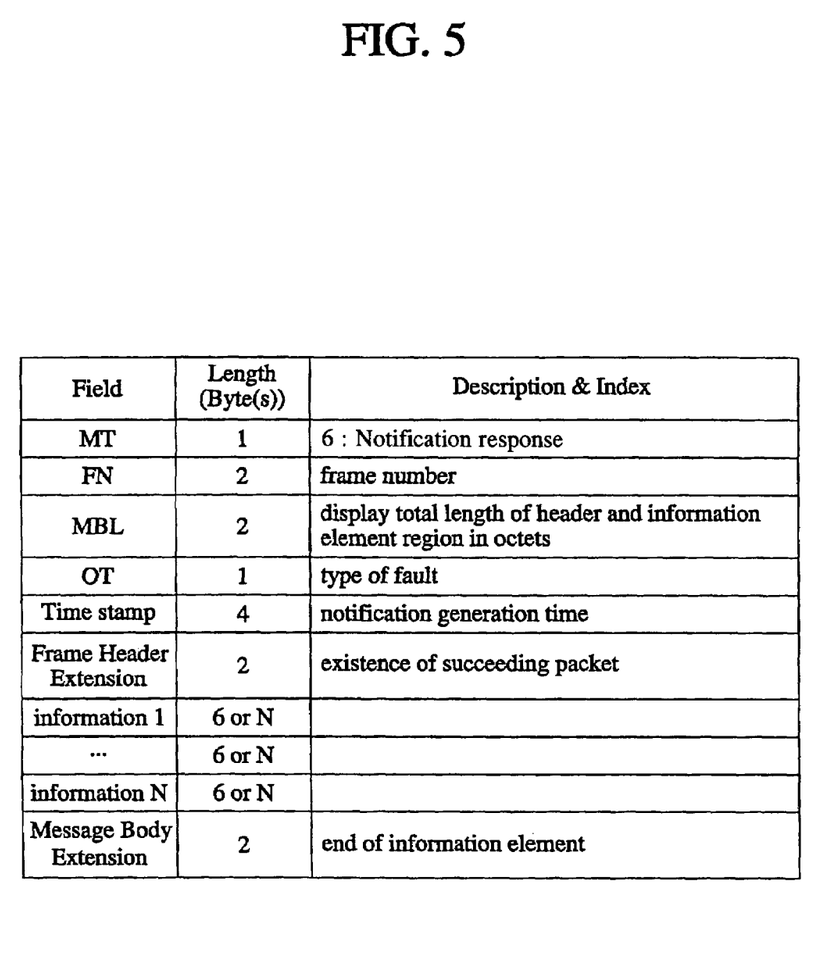
FIG. 5 is a table showing a response message format of the notification message.

FIG. 5 is a table showing a response message format of the notification message.

The notification response message can be distinguished by '6' set up in the message type field. The corresponding frame number is allocated to the frame number field, and the total length of the header and information element region is displayed in octets in the message body length field.

The operation type field has fault information. Here, a notification generation time can be displayed by using a time stamp field.

The frame header extension field indicates existence of the succeeding packet. In the information element, a plurality of fields can be consecutively aligned. The message body extension field is located in the end point of the information field to notify the end of the information element.

Figure 6:
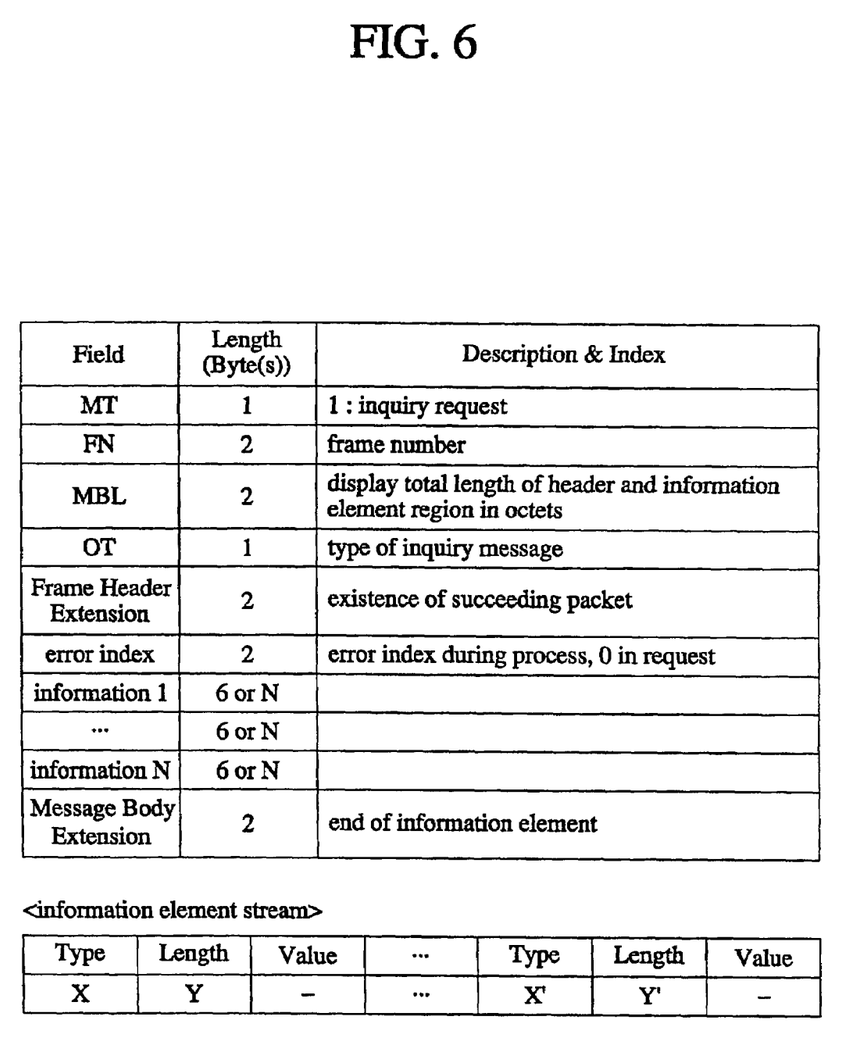
FIG. 6 is a table showing a request message format of an inquiry message.

FIG. 6 is a table showing a request message format of the inquiry message. The inquiry request message can be distinguished by '1' set up in the message type field. In the inquiry request message, the operation type field has the type of the inquiry message. In addition, an error index field is used to indicate information of an error generated during the data transmission and reception between the entities. In the case of the inquiry request, the error index field is set up as '0'.

Here, data packets including the information element identifier, the information element length, and the information element value are repeatedly aligned in the information element stream. The end of the information element is displayed by the setup value of the message body extension field.

Figure 7:
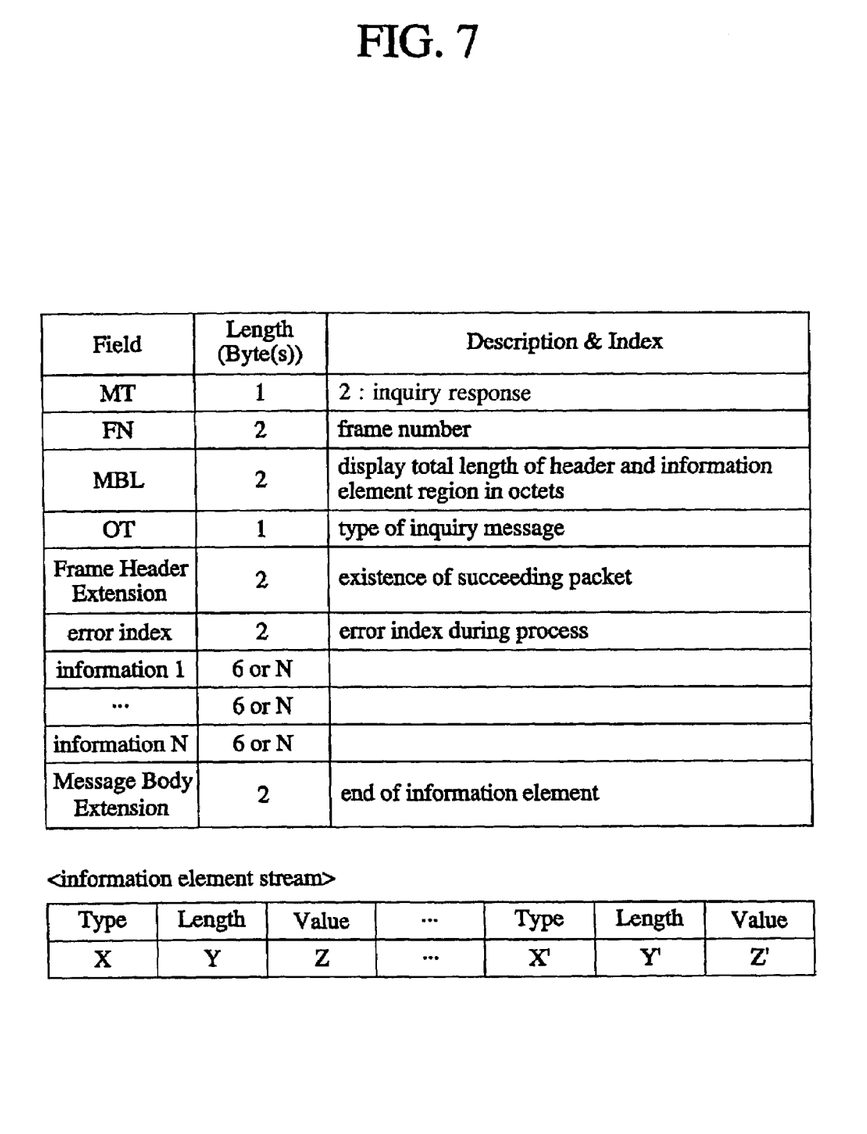
FIG. 7 is a table showing a response message format of the inquiry message.

FIG. 7 is a table showing a response message format of the inquiry message. The inquiry response message can be distinguished by '2' set up in the message type field. In the inquiry response message, the operation type field has the type of the inquiry message. In addition, an error index field is used to indicate information of an error generated during the data transmission and reception between the entities. The error index field includes generated error information.

Figure 8:
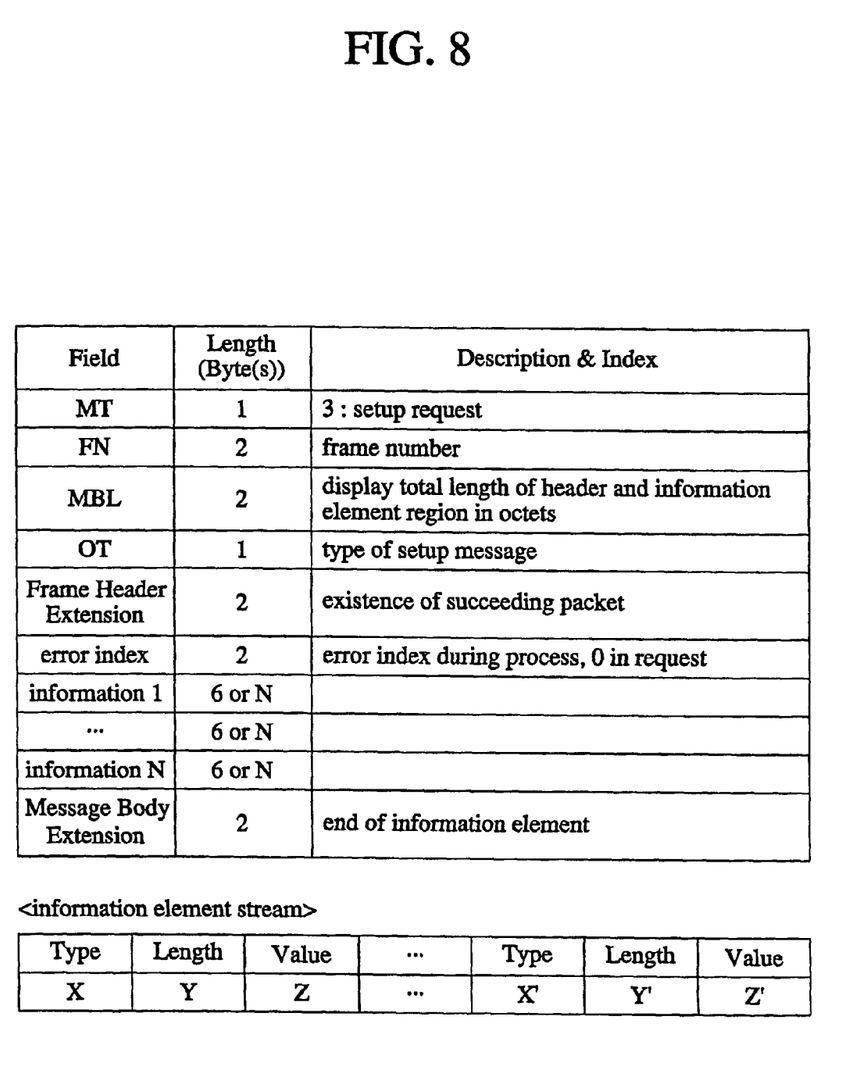
FIG. 8 is a table showing a request message format of a setup message.

FIG. 8 is a table showing a request message format of a setup message. The setup request message can be distinguished by '3' set up in the message type field. In the setup request message, the operation type field has the type of the setup message. In addition, an error index field is used to indicate the information of an error generated during the data transmission and reception between the entities. In the case of the setup request, the error index field is set up as '0'.

Figure 9:
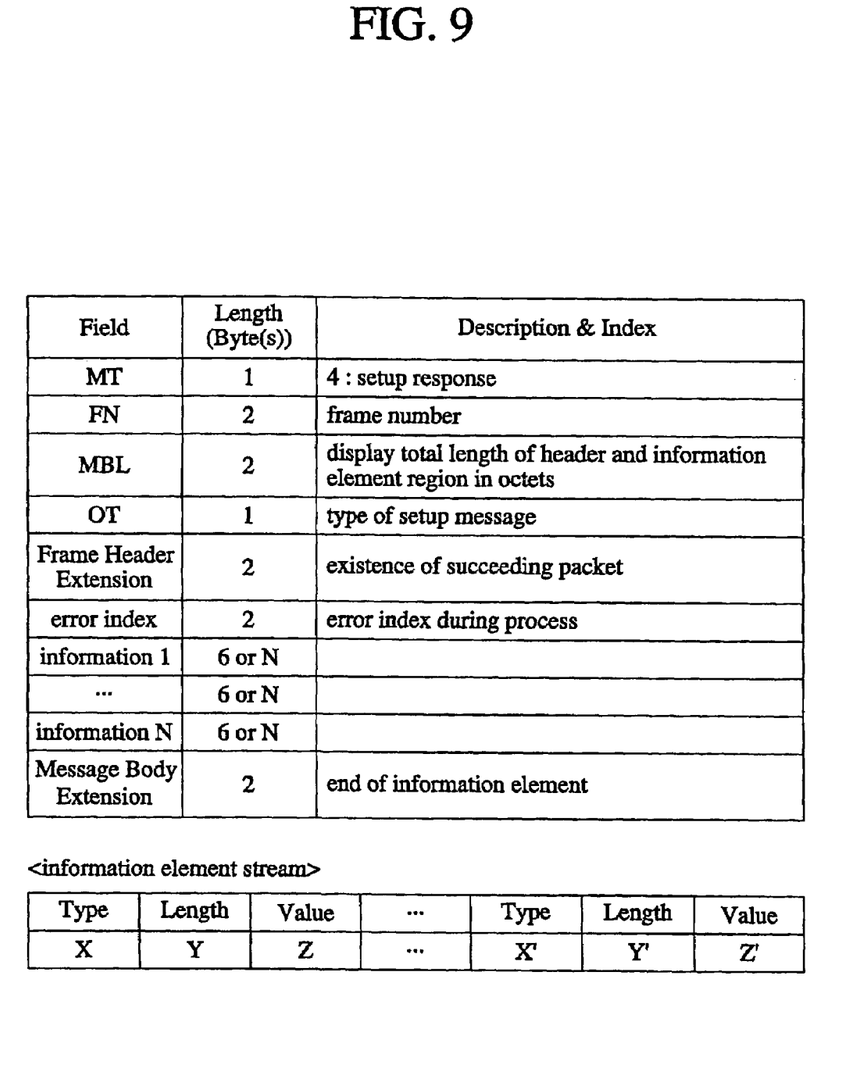
FIG. 9 is a table showing a response message format of the setup message.

FIG. 9 is a table showing a response message format of the setup message. The setup response message can be distinguished by '4' set up in the message type field. In the setup response message, the operation type field has the type of the setup message. In addition, an error index field is used to indicate the information of an error generated during the data transmission and reception between the entities. The error index field includes error information generated during the data processing of the setup message.

When the entities transmit and receive data, they notify a generated alarm, inquire about information, and set up information by using the message formats.

That is, when the alarm is generated in the CPE 2 of FIG. 1, the CPE 2 sets up '5' in the message type field of the notification request message of FIG. 4, assigns fault type to the operation type field, assigns notification generation time to the time stamp field, and transmits the message to the PC 1 (S1). The PC 1 receives and interprets the notification request message from the CPE 2, stores the alarm information generated in the CPE 2 in a database, sets up '6' in the message type field of the notification response message of FIG. 5, assigns the fault type to the operation type field, assigns notification generation time to the time stamp field, and transmits the message to the CPE 2 as a response signal (S2).

On the other hand, when the CPE 2 requests inquiry about information on its succeeding process to the PC 1, the CPE 2 sets up '1' in the message type field of the inquiry request message of FIG. 6, assigns inquiry message type to the operation type field, sets up '0' in the error index field, and transmits the message to the PC 1 (S3). The PC 1 receives and interprets the inquiry request message from the CPE 2, sets up '2' in the message type field of the inquiry response message of FIG. 7, assigns the inquiry message type to the operation type field, assigns error information generated during the inquiry to the error index field, and transmits the message to the CPE 2 as a response signal (S4).

When the PC 1 sets up an operation in the CPE 2, the CPE 2 sets up '3' in the message type field of the setup request message of FIG. 8, assigns setup message type to the operation type field, sets up '0' in the error index field, and transmits the message to the CPE 2 (S5). The CPE 2 receives and interprets the setup request message from the PC 1, sets up '4' in the message type field of the setup response message of FIG. 9, assigns the setup message type to the operation type field, assigns error information generated during the setup to the error index field, and transmits the message to the PC 1 as a response signal (S6).

The present invention can be realized as computer-executable instructions in computer-readable media. The computer-readable media includes all possible kinds of media in which computer-readable data is stored or included or can include any type of data that can be read by a computer or a processing unit. The computer-readable media include for example and is not limited to, storage media, such as magnetic storage media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, and other semiconductor media, electronic media, electromagnetic media and infrared media. The data may be transmitted via a communication medium such as carrier waves (e.g., transmission via the Internet or another computer). The transmission paths of a communication medium generally carry computer-readable instructions, data structures, program modules or other data in a modulated signal such as the carrier waves or other transportable mechanism including any information delivery media. Computer-readable data stored on the media may also be transmitted via a wireless media such as radio frequency, infrared microwaves, and wired media such as a wired network. Also, the computer-readable media can store computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 10:
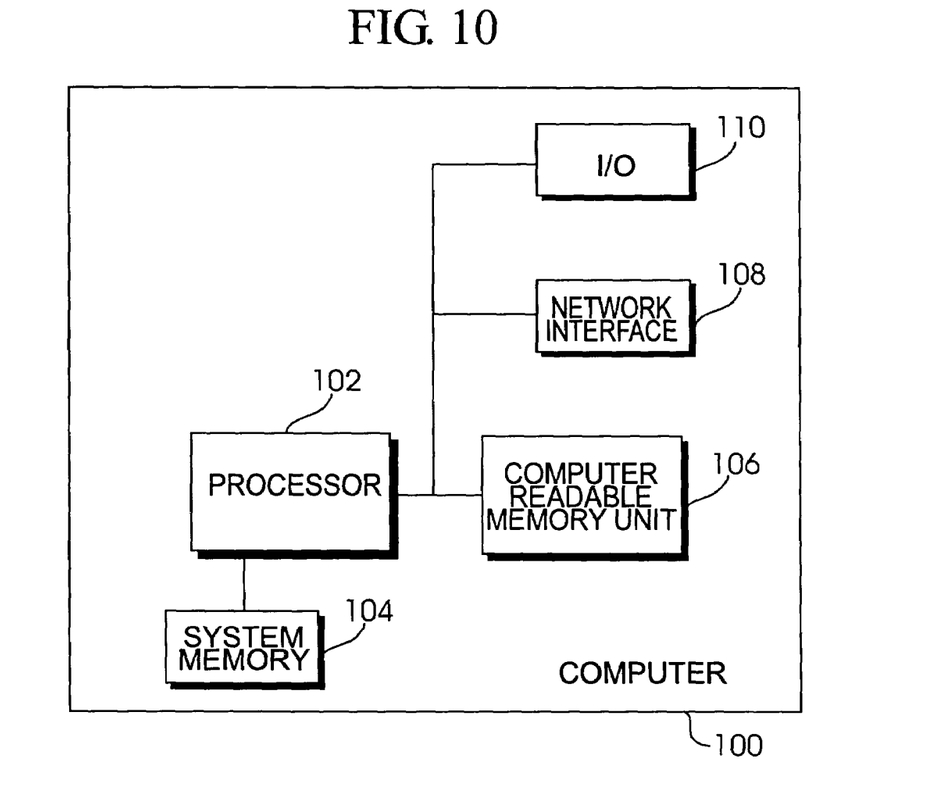
FIG. 10 shows an example of the present invention being realized as computer-executable instructions stored in computer-readable media.

An example of a computer, but not limited to this example of the computer, that can read computer readable media that includes computer-executable instructions of the present invention is shown in FIG. 10. The computer 100 includes a processor (central processing unit) 102 that controls the computer 100. The processor 102 uses the system memory 104 and a computer readable memory device 106 that includes certain computer readable recording media. A system bus connects the processor 102 to a network interface 108, or other interface accommodating a connection to a network. The system bus may also include an input and output interface 110 that accommodates connection to a variety of other devices.

While the invention has been shown and described with reference to a certain preferred embodiment thereof, it will be understood by those skilled in the art that various changes in form and details may be made therein without departing from the spirit and scope of the invention as defined by the appended claims.

In accordance with the present invention, one entity CPE or PC and the other entity CPE or PC can transmit and receive the message by using the generalized TCP protocol. Here, information for operation of the remote management system is assigned to the header and body of the message, to perform reliable communication between the entities.

The remote management system can also remotely monitor and control the customer equipments CPE and PC by efficiently managing the respective information elements.

Therefore, the remote management system improves consumers' satisfaction. Moreover, it can detect fault signs in advance with reference to the fault history. After the fault is generated, the remote management system can efficiently handle the fault by detecting a fault section.

In addition, the remote management system enables remote constitution and inquiry of the customer equipments, and thus provides additional service solution to operators. As a result, the operators can distinguish their services from the other services.

What is claimed is:

1. A method, comprising of:
    transmitting and receiving data between entities in a home network remote management system; and
    remotely managing a home network including at least one entity which creates a message for transport of data with transmission control protocol packet, and transmits the message to other entity or receives the message from other entity,
    with the message comprising a message type field indicating a type of the message, a frame number field distinguishing multiple packets by allocating unique numbers, a message body length field indicating a length of a message body, an operation type field indicating a type of an operation which will be performed between the entities, a frame header extension field indicating existence of a succeeding packet, an information element field indicating an information element which will be processed, and a message body extension field indicating the end of the information element.

2. The method according to claim 1, wherein the type of the message is at least one of a notification message notifying a message from one entity to the other, an inquiry message allowing one entity to take a specific information value from the other entity, and a setup message allowing one entity to set up a specific information value in the other entity.

3. The method according to claim 2, wherein each message is a request message or response message.

4. The method according to claim 2, wherein, when the type of the message is the notification message, the message further comprises a time stamp field indicating a notification generation time.

5. The method according to claim 2, wherein, when the type of the message is the notification message, the operation type field includes the information of the fault type.

6. The method according to claim 2, wherein, when the type of the message is the inquiry or setup message, the message further comprises an error index field including the information of the fault generated during the data transmission and reception between the entities.

7. The method according to claim 2, wherein, when the type of the message is the inquiry message, the operation type field includes the information of inquiry message type.

8. The method according to claim 2, wherein, when the type of the message is the setup message, the operation type field includes the information of setup message type.

9. The method according to claim 1, wherein the information element field comprises an information element identifier field, an information element length field and an information element value field, the information element identifier field includes information element item information, and the information element length field includes a size of the information element identifier field and a size of the information element length field and a size of the information element value field, and the information element value field includes value information of the corresponding information element.

10. A computer-readable storage medium having stored thereon a data structure of a message comprising:
    a first field of the data structure of a message for transmitting and receiving data between entities in a home network remote management system and remotely managing a home network including at least one entity which creates the message for transport of data with transmission control protocol packet and transmits the message to another entity or receives the message from another, containing data representing a type of the message;
    a second field containing data by which the message is distinguished from multiple packets by unique numbers allocated to the second field;
    a third field containing data representing a total length of the data structure;
    a fourth field containing data representing a type of an operation which will be performed between the entities, with the data contained in the fourth field being determined in correspondence with the data contained in the first field;
    a fifth field containing data representing an existence of a succeeding packet following the message;
    a sixth field containing data representing an information element which will be processed; and
    a seventh field containing data representing an end of the sixth field.

11. The computer-readable storage medium having stored thereon the data structure of claim 10, with the type of the message being at least one of a notification message notifying a message from one entity to the other, an inquiry message allowing one entity to take a specific information value from the other entity, and a setup message allowing one entity to set up a specific information value in the other entity.

12. The computer-readable storage medium having stored thereon the data structure of claim 11, with each message being a request message or response message.

13. The computer-readable storage medium having stored thereon the data structure of claim 12, when the type of the message is the notification message, the message further comprises an eighth field representing a notification generation time.

14. The computer-readable storage medium having stored thereon the data structure of claim 12, when the type of the message is the notification message, the fourth field includes the information of the fault type.

15. The computer-readable storage medium having stored thereon the data structure of claim 12, when the type of the message is the inquiry or setup message, the message further comprises a ninth field including the information of the fault generated during the data transmission and reception between the entities.

16. The computer-readable storage medium having stored thereon the data structure of claim 12, when the type of the message is the inquiry message, the fourth field includes the information of inquiry message type.

17. The computer-readable storage medium having stored thereon the data structure of claim 12, when the type of the message is the setup message, the fourth field includes the information of setup message type.

18. The computer-readable storage medium having stored thereon the data structure of claim 12, with the sixth field comprising an information element identifier field, an information element length field and an information element value field, the information element identifier field including information element item information, and the information element length field including a size of the information element identifier field and a size of the information element length field and a size of the information element value field, and the information element value field including value information of the corresponding information element.

19. A computer-readable storage medium having computer-executable instructions for performing a method, comprising:
   when an alarm is generated in a customer premise equipment, setting up by the customer premise equipment a first index in a message type field of a notification request message;
   assigning fault type to an operation type field of the notification request message;
   assigning notification generation time to a time stamp field of the notification request message;
   transmitting the notification request message to a personal computer;
   receiving and interpreting the notification request message from the customer premise equipment by the personal computer;
   storing the alarm information generated in the customer premise equipment in a database;
   setting up a second index in the message type field of a notification response message;
   assigning the fault type to the operation type field of the notification response message;
   assigning notification generation time to the time stamp field of the notification response message;
   transmitting the notification response message to the customer premise equipment as a response signal;
   when the customer premise equipment requests inquiry about information on its succeeding process to the personal computer, setting up by the customer premise equipment a third index in the message type field of an inquiry request message;
   assigns inquiry message type to the operation type field of the inquiry request message;
   setting a certain value in an error index field of the inquiry request message;
   transmitting the inquiry request message to the personal computer;
   receiving and interpreting the inquiry request message from the customer premise equipment by the personal computer;
   setting up a fourth index in the message type field of the inquiry response message;
   assigning the inquiry message type to an operation type field of the inquiry response message;
   assigning error information generated during the inquiry to an error index field of the inquiry response message;
   transmitting the inquiry response message to the customer premise equipment as a response signal;
   when the personal computer sets up an operation in the customer premise equipment, setting up a fifth index by the customer premise equipment in the message type field of the setup request message;
   assigning setup message type to an operation type field of the setup request message;
   setting up a certain value in an error index field of the setup request message;
   transmitting the setup request message to the customer premise equipment;
   when the customer premise equipment receives and interprets the setup request message from the personal computer, setting up a sixth index in the message type field of the setup response message;
   assigning a setup message type to the operation type field of the setup response message;
   assigning error information generated during the setup to an error index field of the setup response message; and
   transmitting the setup response message to the personal computer as a response signal.

20. A method of transmitting and receiving data between entities in a home network remote management system, comprising:
   when an alarm is generated in a customer premise equipment, setting up by the customer premise equipment a first index in a message type field of a notification request message;
   assigning fault type to an operation type field of the notification request message;
   assigning notification generation time to a time stamp field of the notification request message, and
   transmitting the message to a personal computer.

21. The method of claim 20, further comprising:
   receiving and interpreting the notification request message from the customer premise equipment by the personal computer;
   storing the alarm information generated in the customer premise equipment in a database;
   setting up a second index in the message type field of a notification response message;
   assigning the fault type to the operation type field of the notification response message;
   assigning notification generation time to the time stamp field of the notification response message; and
   transmitting the message to the customer premise equipment as a response signal.

22. The method of claim 20, further comprising:
   when the customer premise equipment requests inquiry about information on its succeeding process to the personal computer, setting up by the customer premise equipment a third index in the message type field of an inquiry request message;

assigns inquiry message type to the operation type field of the inquiry request message;

setting a certain value in an error index field of the inquiry request message; and transmitting the message to a personal computer.

23. The method of claim 22, further comprising:

receiving and interpreting the inquiry request message from the customer premise equipment by the personal computer;

setting up a fourth index in the message type field of the inquiry response message;

assigning the inquiry message type to an operation type field of the inquiry response message;

assigning error information generated during the inquiry to an error index field of the inquiry response message; and transmitting the message to the customer premise equipment as a response signal.

24. The method of claim 20, further comprising:

when the personal computer sets up an operation in the customer premise equipment, setting up a fifth index by the customer premise equipment in the message type field of the setup request message;

assigning setup message type to an operation type field of the setup request message;

setting up a certain value in an error index field of the setup request message; and transmitting the message to the customer premise equipment.

25. The method of claim 24, further comprising:

when the customer premise equipment receives and interprets the setup request message from the personal computer, setting up a sixth index in the message type field of the setup response message;

assigning a setup message type to the operation type field of the setup response message;

assigning error information generated during the setup to an error index field of the setup response message; and transmitting the message to the personal computer as a response signal.

* * * * *